US006294505B1

(12) United States Patent
Luers et al.

(10) Patent No.: US 6,294,505 B1
(45) Date of Patent: Sep. 25, 2001

(54) INTEGRATED ADDITIVE COMPOSITION, PROCESS FOR ITS PREPARATION AND ITS USE

(75) Inventors: Georg Luers, Westhofen; Andreas Schmidt, Manheim, both of (DE)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 09/622,102
(22) PCT Filed: Feb. 3, 1999
(86) PCT No.: PCT/EP99/00659
   § 371 Date: Aug. 10, 2000
   § 102(e) Date: Aug. 10, 2000
(87) PCT Pub. No.: WO99/41308
   PCT Pub. Date: Aug. 19, 1999

(30) Foreign Application Priority Data

Dec. 12, 1998 (DE) .............................................. 198 05 458

(51) Int. Cl.[7] .................. C10M 103/00; C10M 105/68; C08K 9/12; C08L 23/02; C08J 5/18
(52) U.S. Cl. ..................... 508/136; 508/551; 106/482; 106/485; 106/486; 106/491; 524/232; 524/231; 523/210; 523/26
(58) Field of Search .................... 508/136, 551; 523/210, 216; 524/232, 231; 106/482, 485, 486, 491

(56) References Cited

U.S. PATENT DOCUMENTS

| | | | | |
|---|---|---|---|---|
| 3,252,859 | * | 5/1966 | Silver et al. | 167/53.2 |
| 4,246,198 | * | 1/1981 | Rosenberger et al. | 564/158 |
| 4,675,122 | * | 6/1987 | Luers et al. | 252/28 |
| 4,844,980 | * | 7/1989 | Gruning et al. | 428/405 |
| 4,995,995 | * | 2/1991 | Garvey et al. | 252/28 |
| 5,128,067 | * | 7/1992 | Placek | 252/602 |
| 5,167,851 | * | 12/1992 | Jamison et al. | 252/74 |
| 5,366,645 | * | 11/1994 | Sobottka | 252/28 |
| 5,609,679 | * | 3/1997 | Luers et al. | 523/200 |
| 5,792,808 | * | 8/1998 | Sobuttka et al. | 524/450 |
| 6,066,691 | * | 5/2000 | Sobottka et al. | 524/540 |

FOREIGN PATENT DOCUMENTS

| | | | | |
|---|---|---|---|---|
| 841671 | 5/1970 | (CA) | | 400/43 |
| 138203 | 10/1984 | (EP) | | C08J/3/22 |
| 184276 | 6/1986 | (EP) | | C08K/9/12 |

* cited by examiner

Primary Examiner—Margaret Medley
(74) Attorney, Agent, or Firm—Charles A. Cross

(57) ABSTRACT

The present invention relates to an integrated additive composition which contains anti-blocking agents and at least one organic component and is characterized in that the organic component(s) is (are) localized in a concentration of 5 to 65 wt.-%, relative to the total weight of the composition, in the pores of the anti-blocking agent, the volume of the organic component(s) not being greater, however, than the pore volume of the anti-blocking agent. The invention also describes processes for the preparation of this integrated additive composition and its use in polyolefin films and in injection molding.

18 Claims, 3 Drawing Sheets

-●- Integrated additive composition before transport
-▲- Standard material before transport
-○- Integrated additive composition after transport
-△- Standard material after transport

Figure 1

Homogeneity of the integrated additive composition before and after pneumatic transport

- ●- Integrated additive composition before transport
- ▲- Standard material before transport
- ○- Integrated additive composition after transport
- △- Standard material after transport X-axis: Sample no.
Y-axis: Residue on ignition [%]

Figure 2

Homogeneity of the material prepared in accordance with Example 2 from EP 0 138 203 before and after pneumatic transport

INTEGRATED ADDITIVE COMPOSITION, PROCESS FOR ITS PREPARATION AND ITS USE

The invention relates to an integrated additive composition, to processes for its preparation and to its use, in particular to its use in polyolefin films as in the production of polyolefin films and in injection moulding.

In the production of polymer films, in particular on the basis of polyolefins, two additives in particular among others play an important role: a) anti-blocking agents and b) slip agents. Synthetic amorphous, porous silica gels such as for example SYLOBLOC®, which is produced by the applicant GRACE GmbH itself, are widely used as anti-blocking agents. Aliphatic acid amides, in particular oleic acid amide and erucic acid amide, are often used as slip agents. These two components are typically used in concentrations of 1000 to 3000 ppm, relative to the component in question, in the polymer films.

In order to achieve profitable process conditions, it is of importance that pre-mixed powders comprising for example anti-blocking agent and slip agent are available. However, these pre-mixtures are frequently subject to a demixing process if the powdery material is pneumatically conveyed over longer distances. Furthermore, the organic components, such as for example slip agents, act as adhesives in such pre-mixed powders and have an adverse effect on the free-flowing properties of these powders.

Thus DE 12 64 054 Rexall Drug & Chemical Co. describes a powdery free-flowing additive composition which contains polyolefin powder, anti-blocking agents and slip aids. However, because of the different particle sizes and densities used, a separation of the individual components of the composition readily occurs.

EP-A-0 138 203 describes the preparation of mixtures of silica gel and slip agents in order to obtain polyolefin masterbatches with a high concentration of anti-blocking agent and slip agent. The first stage in the preparation of a masterbatch having a high concentration is the mixing of the silica gel with the slip agent. This is achieved, as described in example 1 of EP-A-0 138 203, by mixing in a double-cone mixer. Also, the additive described there is ground in an impact mill with the addition of liquid nitrogen. This disclosed process does not, however, lead to free-flowing powders which can be pneumatically conveyed without sticking or being separated into their constituents.

The object of the present invention is therefore to create a composition which combines several substances used as additives in the production of polymer films and is present in a form which allows it to be used in an economically advantageous way as a powder with good free-flowing properties. It is also the object of the invention to provide processes for the preparation of such compositions.

This object is achieved by an integrated additive composition which contains anti-blocking agents and at least one organic component which is characterized in that the organic component(s) is (are) localized in a concentration of 5 to 65 wt.-%, relative to the total weight of the composition, in the pores of the anti-blocking agent, the volume of the organic component(s) not being greater however than the pore volume of the anti-blocking agent.

The subject-matter of the present invention are also processes for the preparation of the integrated additive composition according to the invention.

The use of the compositions according to the invention in polyolefins and in injection moulding are also the subject-matter of the present invention.

Preferred versions of the invention are the subject-matter of the dependent claims.

FIG. 1 and FIG. 2 show the residues on ignition of the integrated additive composition according to the invention before and after pneumatic transport compared with mixtures known from the state of the art.

Figure 3:
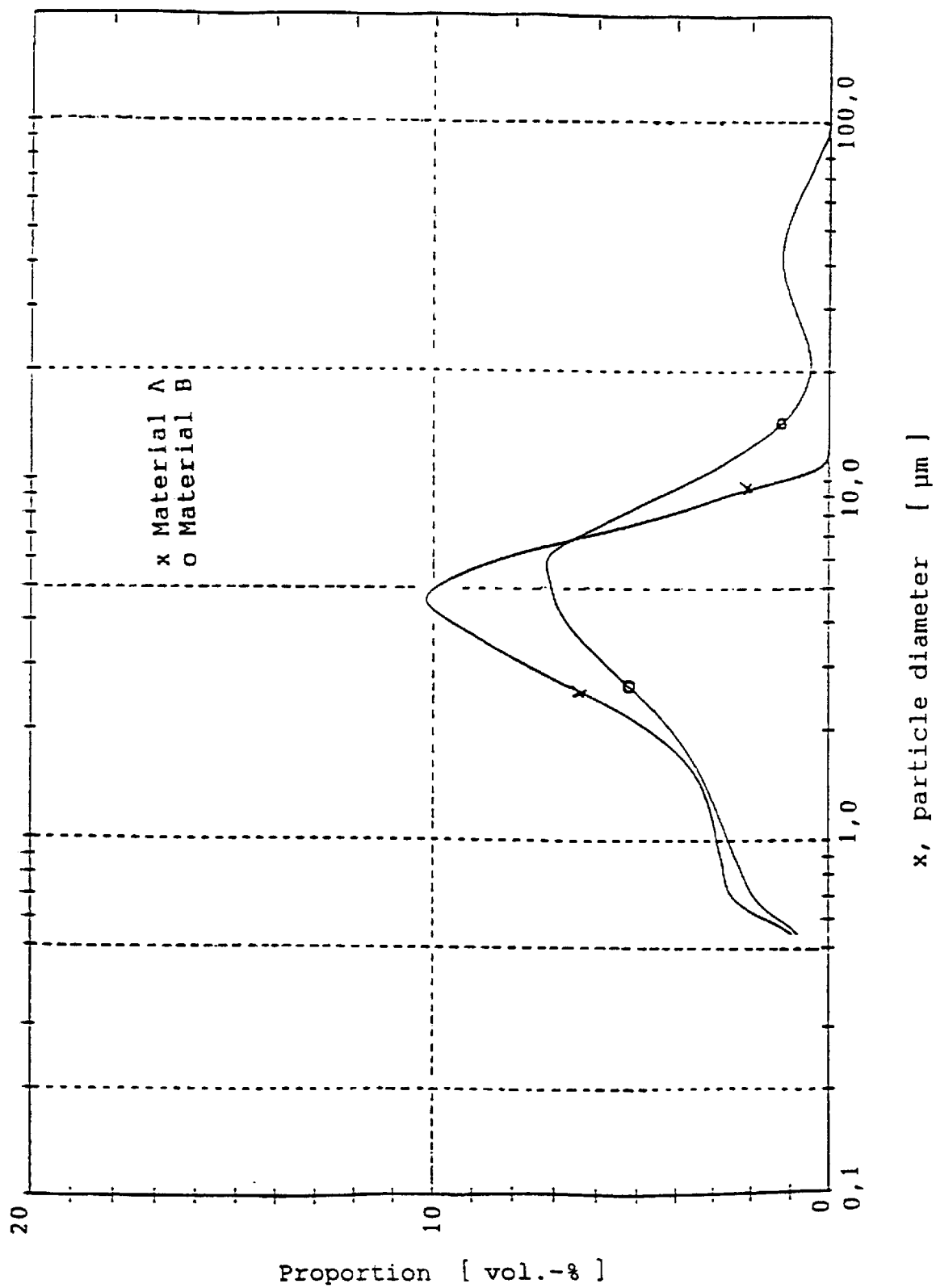
FIG. 3 shows the size distribution of the particles of the powder on the basis of the integrated additive composition according to the invention compared with a physical mixture known from the state of the art.

The invention is thus based on the surprising realization that, during the preparation of an integrated additive composition in which the organic components are localized in the pores of anti-blocking agents, a powder is obtained which has outstanding free-flowing properties and displays no signs of demixing of the components even after prolonged pneumatic conveyance. The composition according to the invention is also stable during transport by other means.

Although the integrated additive compositions according to the invention (also called integrated compositions in the following) contain anti-blocking agents which are known as such, their selection is still of great significance according to the invention. Accordingly, only those products which permit an integrated incorporation of the organic components can be used as anti-blocking agents, so that a free-flowing powder is obtained which also displays an adequate stability vis-à-vis demixing of the components during pneumatic conveyance or transport by other means and does not agglutinate. Anti-blocking agents are therefore used which have a porous structure and thus suitable pore volumes.

The anti-blocking agents that can be used according to the invention include micronized silica gel, precipitated silica and/or diatomaceous earth. Suitable products customary in the trade have a particle size in the range from 2 to 15 µm preferably 3 to 10 µm. For example, the SYLOBLOC® products manufactured by the Applicant can be used.

It is thus important that the anti-blocking agent is sufficiently micronized before the organic components are incorporated. An anti-blocking agent on the basis of silica gel with a specific pore volume of 0.4 ml/g to 1.8 ml/g, in particular 0.7 ml/g to 1.6 ml/g, is preferred according to the invention.

Suitable as organic components for the preparation of the compositions according to the invention in any proportions are one or more of the following components selected from the group consisting of slip agents such as fatty acid amides, primary antioxidants such as phosphorus compounds, thioesters and hydroxylamines, secondary antioxidants such as ammonium salts, glycerol esters and anion-active substances, light stabilizers such as benzophenones, benzotriazoles and HALS (sterically hindered amine light stabilizers), flame-protection agents and synergistic substances such as halogenated organic molecules and metal hydrates, plasticizers such as phthalates, process auxiliaries such as glycerol, alcohol esters, wax amides, fatty acids, metal stearates, natural waxes and polyethylene and polypropylene waxes and other additives such as antimicrobial agents, propellants, organic peroxides, fillers and stabilizers. Mixtures of these components can also be processed according to the invention to produce an integrated additive composition with the anti-blocking agents.

Slip agents, preferably slip agents which comprise one or more unsaturated fatty acid amides, are preferably integrated into the anti-blocking agents. Particularly preferred organic components are unsaturated fatty acid amides with 18 to 22 carbon atoms, for example oleic acid amide and erucic acid amide. Good results were obtained for example with oleic acid amide which had an average particle size of 38 μm.

As well as those mentioned above, other organic or inorganic components which are customarily used in the preparation of polymer films can be contained in the compositions according to the invention.

The procedure when preparing the additive compositions according to the invention is generally that firstly the anti-blocking agent is brought to the desired fineness by suitable reduction machines such as jet, impact and ball mills. The particle sizes of the organic components are not of great importance, but finer particles are preferred. The anti-blocking agents in the final grain size and the organic components are poured together into a mixer. The devices used for mixing during the further course of the process according to the invention must be capable of influencing the temperature of the mixtures. For this, these devices can either have suitable heating devices which permit the supply of adequate quantities of heat, or the mixing takes place in such a way that adequate heat is produced.

The process for the preparation of the additive compositions according to the invention can thus be carried out in such a way that so much heat is supplied during mixing that a temperature is reached which is higher than the melting point of that organic material present in the mixture which has the highest melting point, and in general lies in the range from 60 to 180° C., preferably in the range from 90 to 160° C.

This can be achieved for example by using a heatable mixer such as a double-walled mixer in which the heat from an external source is conducted through the walls to the mixture or by means of high-speed mixing in which the heat forms in the mixture through the friction of the particles.

The temperature of the mixture while it is being prepared is thus generally 60 to 180° C. and is preferably 1 to 15° C., in particular 5 to 10° C. higher than the melting point of that organic material which has the highest melting temperature. If the temperature is not controlled in this way, the organic material can experience a yellowish discoloration at high temperatures or unmelted organic particles may remain behind at low temperatures.

Another possibility for preparing the compositions according to the invention is to use a jet mill in which the anti-blocking agent is reduced (micronized) and the organic components are melted in at the same time. To obtain the additive composition according to the invention, it is important with this process variant to control the rates of feed of all the components individually and continuously by means of gravimetry.

Finally, there is the possibility to prepare the integrated additive compositions according to the invention by introducing the anti-blocking agent, for example silica gel, and the organic components, for example slip agents, into a fluid bed that is operated batchwise or continuously. A temperature above the melting point of the highest-melting organic component, as was described above, then leads to the melting of the organic components into the pores of the anti-blocking agent.

The particle size (median value of the volume distribution) is measured using a Malvern Mastersizer from Malvern Instruments Ltd. The specific pore volume is determined using an ASAP 2100 nitrogen adsorption measurement apparatus from Micromeritics.

The additive composition according to the invention that can be obtained by the processes described above preferably has an average particle size (median value of the volume distribution) of 2 to 15 μm, in particular 3 to 10 μm. Unlike a physical mixture, the compositions according to the invention have an upper limit of particle size distribution which is only 2.5 times the median value (see FIG. 3). The so-called X-90 value of the volume distribution is taken as the upper limit, i.e. 90% of the particle volume are smaller than this value.

The additive compositions according to the invention can advantageously be used when processing polyolefins and in injection moulding applications. Here, being a free-flowing powder which does not agglutinate and which can be pneumatically conveyed without problems, they can easily be incorporated into polyolefins, for example when processing and producing polyolefin films. Through the incorporation of the organic components into the anti-blocking agent, adequately high concentrations of the organic components in question such as slip agents can be used at the same time without dispensing problems. Nor is there the additional cost of having to dispense several powdered additives.

EXAMPLES

Example 1

Preparation of the Additive Compositions According to the Invention 37. 5 kg of micronized silica gel having a specific pore volume of 0.95 ml/g and a particle size of 4.9 μm (median value of the volume distribution) were weighed together with 25 kg of Erucamid (Croda Universal Ltd. Hull/Great Britain) into a 500-1 Henschel FM 500 mixer at ambient temperature. Mixing was started at 860 rpm (revolutions per minute), which corresponds to a circumferential velocity of 40 m/s. After 12 minutes the temperature had reached 90° C., which is some 10° C. above the melting point of the organic component (78 to 81° C.). The mixing process was then stopped and the material was transferred into a 2000-1 cooling mixer of the Henschel type, in which the material was stirred for 20 minutes at 100 rpm. The final temperature of the composition before packing was 35° C.

Example 2

Stability Vis-à-Vis Demixing

A bag of material produced in accordance with Example 1 and a bag of a material which was produced by the standard procedure, i.e. by mixing the anti-blocking agent and the organic component, the same starting substances being used as in Example 1, at ambient temperature in a Lödige mixer (type KM300 D 2MZ, Lödige, Paderborn), were tested for homogeneity. On leaving the Lödige mixer, the material produced by the standard procedure had a temperature of about 30° C. 8 samples each of 2 g were taken from the bags at various points. The residue on ignition was measured after the sample had been heated for 15 minutes at 950° C.

The materials from both bags were pneumatically transported over a distance of 10 m in a steel pipe with a diameter of 70 mm and collected in a filter. This was carried out using an industrial vacuum cleaner (Nilfisk GB 933 DN 70, Nilfisk, Brondby). For both products, homogeneity after conveyance was tested by taking 8 samples from the filter collection and again measuring the resi-due on ignition. The results are shown in Table I and FIG. 1.

TABLE I

| Samples taken | Integrated additive composition prepared according to Example 1 before transport | Standard material before transport | Material prepared according to Example 2 in EP 0 138 203 before transport | Integrated additive composition prepared according to Example 1 after transport | Standard material after transport | Material prepared according to Example 2 in EP 0 138 203 after transport |
|---|---|---|---|---|---|---|
| Average residue on ignition | 52.9 | 54.1 | 57.14 | 53.2 | 51.7 | 57.91 |
| Standard deviation of the residue on ignition (% points) | 0.14 | 0.11 | 0.99 | 0.33 | 2.89 | 4.87 |

While the standard deviation of the residue on ignition of the additive composition according to the invention is still very small even after pneumatic conveyance, the standard deviation of the standard material is very much poorer than a user can tolerate. Standard deviations of about 0.5% points are tolerable. On the basis of these results, the pneumatic conveyance of the standard material cannot be recommended, whereas the additive composition according to the invention can be used without any restriction. The stability vis-à-vis demixing of the powder on the basis of the composition according to the invention is thus clearly superior to that of the standard materials (simple physical particle mixtures).

Example 3

Using an Alpine laboratory mill, mixtures as disclosed in Example 2 of EP-A-0 138 203 were prepared accompanied by cooling with liquid nitrogen. A fine powder of yellowish colour was obtained. The starting substances used were identical to those of the additive compositions according to the invention. The obtained powder was characterized as described in Example 2 with regard to its stability vis-à-vis demixing. The results are likewise shown in Table 1 and FIG. 2. Already after mixing and still before transport in air, the standard deviation is 0.99% points, and after pneumatic conveyance it reaches the unacceptable value of 4.9% points.

Example 4

An integrated additive composition according to the invention was prepared as described in Example 1, which consisted of amorphous, porous silica gel having an average particle size of 4.9 μm (Grace GmbH commercial product SYLOBLOC®45) and fatty acid amide Erucamid ER (Croda Universal Ltd. commercial product) in the ratio 70:30 parts by weight. (material A). For comparison, a physical mixture of the two named components in the same ratio was produced as described in Example 2 using the standard pro-cedure (material B). The size distributions of the particles in air was then determined using the Malvern Mastersizer. For this, a special dispersion module was used employing hydraulic shearing force in order to separate the particles from one another. The distribution is then measured by means of light scatter.

The results are shown in FIG. 3. It will be seen that the size distribution of the particles of the composition according to the invention (material A) is clearly narrower compared with that of the physical mixture (material B). Also, in the case of material B a much broader peak is to be seen in the range from 30 to 40 μm. Its absence in the composition according to the invention demonstrates the uptake of the organic component into the pores of the silica gel and thus its superior material properties.

Example 5

If silica gel is incorporated into a polyolefin, air bubbles can form in the granules. This effect is also called pellet void formation. The voids are caused by the fact that moisture evaporates from the silica gel at high extrusion temperatures. Some of these air bubbles can also create so-called "lenses" in a film produced from them. This can be seen in particular in black films in which the reduced thickness (because of the gas present in the "lenses") shows up as a grey area.

In this example the percentage void content of the polymer is measured by measuring the density of pellets with voids and the density of the pellets after the removal of these voids.

For this, the following samples were compared:

A: mixture prepared with a Lödige mixer as described in Example 2 consisting of SYLOBLOC 45/Crodamid ER in the ratio 70:30 parts by weight B: integrated additive composition according to the invention prepared in accordance with Example 1 consisting of SYLOBLOC 45/Crodamid ER in the ratio 70:30 parts by weight The two samples were introduced in a Theysohn twin-screw extruder (FSK 30/40D) into Innovex LLDPE (low-density polyethylene) from BP without utilizing the possibility of venting the extruder by vacuum and without a sieve. The two samples were each introduced into the molten polymer via a side feed. The strands leaving the extruder were passed through a water bath for cooling prior to granulation. A clear difference was visible. The strand with product A contained a large number of bubbles whereas the strand with product B based on the integrated additive composition according to the invention contained no bubbles.

Determination of the Pellet Voids

The determination was carried out by comparing the density of the granules in question (with voids) with the density of the poly-meric composition after the voids had been pressed out. Because of the scatter in the quantity of voids, a relatively large sample (50 g) was necessary. A 100-ml pycnometer was used with isopropanol for the measurement.

To determine the density of the polymeric composition without voids, the following procedure was used: 40 g of granular product which had been prepared from the extruded strands were pressed into sheets (200×200×0.8 mm) with a laboratory polymer press (Collin 200 P) with a pressure of 40 bar in order to remove the air bubbles. Polymer granules (diameter 4 mm) were then punched out from the pressed sheets.

To measure the density of these particles, a very precise method using a density gradient column was employed. For this, the column (height 1 m, diameter 100 mm) was filled with a water/isopropanol mixture. The composition of the column and the filling were controlled so that a density gradient in the expected density range of the polymer was created. The column was calibrated using calibrated density floats. For this, 3 mm of testpieces of a known density were introduced into the solution. The height at which the testpieces settled after about 20 minutes was plotted on a graph to establish a calibration curve for the column. The associated density was read off by comparing the floating height of the samples of granular product with the calibration curve.

$$\text{Voids in \%} = \frac{\text{(density after pressing out)} - \text{(density before pressure out)}}{\text{Density after pressing out}}$$

TABLE II

| Sample number | Density g/ml | Density after pressing out g/ml | Voids in % |
|---|---|---|---|
| Sample A | 0.881 | 0.9342 | 5.7 |
| Sample B | 0.920 | 0.9339 | 1.5 |

The results presented in Table II show that the empty pores in the silica gel in sample A cause the formation of bubbles in the polymer strand coming out of the extruder. This is shown by the apparently low density. The "full" densities of both samples were virtually identical. It can be expected that the presence of voids in the polymer leads to the creation of visible "lenses" in the finished film.

What is claimed is:

1. Integrated additive composition which contains anti-blocking agent and at least one organic component, characterized in that organic component is localized in a concentration of 5 to 65 wt.-%, relative to the total weight of the composition, in the pores of the anti-blocking agent, the volume of the organic component not being greater than the pore volume of the anti-blocking agent, and the organic component comprises at least one member selected from the group consisting of (1) slip agents from the group of fatty acid amides, (2) primary antioxidants from the group of phosphorus compounds, thioesters and hydroxylamines, (3) secondary antioxidants from the group of ammonium salts, glycerol esters and anion-active substances, (4) light stabilizers from the group of benzophenones, benzotriazoles and sterically hindered amine light stabilizer, (5) flame-protection agents and synergistic substances from the group of halogenated organic molecules and metal hydrates, (6) plasticizers from the group of phthalates, (7) process auxiliaries from glycerol and/or the group of alcohol esters, wax amides, fatty acids, metal stearates, natural waxes and polyethylene and polypropylene waxes and (8) additives from the group of antimicrobial agents, propellants, organic peroxides, fillers and stabilizers.

2. Composition according to claim 1 wherein the anti-blocking agent comprises a member of the group consisting of micronized silica gel, precipitated silica and diatomaceous earth.

3. Composition according to claim 1 wherein the anti-blocking agent is micronized silica gel having a specific pore volume of 0.4 ml/g to 1.8 ml/g.

4. Composition according to claim 1 wherein the organic component is slip agent which comprises one or more unsaturated fatty acid amides.

5. Composition according to claim 1 wherein the composition has an average particle size relative to the median value of the volume distribution of 2 to 15 $\mu$m, and the upper limit of the particle size, as defined as the particle size at which 90% of the volume of the particles are smaller than the given value, is 2.5 times the average value of the particle size.

6. Composition according to claim 3 wherein the organic component is slip agent which comprises one or more unsaturated fatty acid amides.

7. Process for preparing integrated additive composition comprising
   (a) selecting a porous anti-blocking agent,
   (b) selecting at least one organic component of the group consisting of (1) slip agents from the group of fatty acid amides, (2) primary antioxidants from the group of phosphorus compounds, thioesters and hydroxylamines, (3) secondary anti-oxidants from the group of ammonium salts, glycerol esters and anion-active substances, (4) light stabilizers from the group of benzophenones, benzotriazoles and sterically hindered amine light stabilizers, (5) flame-protection agents and synergistic substances from the group of the halogenated organic molecules and metal hydrates, (6) plasticizers from the group of phthalates, (7) process auxiliaries, from glycerol and/or the group of alcohol esters, wax amides, fatty acids, metal stearates, natural waxes and polyethylene and polypropylene waxes and (8) additives from the group of antimicrobial agents, propellants, organic peroxides, fillers and stabilizers, the volume of (b) not greater than the pore volume of the antiblocking agent and the weight of (b) in the range of about 5 to 65% relative to the total weight of additive composition,
   (c) mixing the antiblocking agent of (a) and organic component of (b),
   (d) separately or concurrently with (c), heating the mixture from (c) to a temperature higher than the melting point of the organic component, and
   (e) cooling the heated mixture of (d) to recover integrated additive composition comprising about 5 to 65% by weight organic component relative to the total weight of the composition and the organic component is located in the pores of the antiblock agent.

8. Process according to claim 6, wherein the temperature of (d) is 1 to 15° C. higher than a melting point of organic component having the highest melting temperature.

9. Process according to claim 6, wherein mixing of (c) and heating of (d) is concurrent and a heatable mixer is used to perform (c) and (d).

10. Process according to claim 6, wherein a high-speed propeller mixer is used in (d) to heat the material by friction between the particles.

11. Process according to claim 6 wherein (c) and (d) are concurrent and a fluid bed is used to melt the organic component.

12. Process according to claim 6 wherein the anti-blocking agent is porous silica gel.

13. Process according to claim 12 wherein (c) and (d) are concurrent and a jet mill is used to micronize the silica gel to a desired particle size and melt the organic component.

14. Polyolefin film comprising integrated additive composition which contains anti-blocking agent and at least one organic component, wherein organic component is localized in a concentration of 5 to 65 wt.-%, relative to the total weight of the composition, in the pores of the anti-blocking agent, the volume of the organic component not being greater than the pore volume of the anti-blocking agent, and the organic additive component comprises at least one member selected from the group consisting of (1) slip agent from the group of fatty acid amides, (2) primary antioxidants from the group of phosphorus compounds, thioesters and hydroxylamines, (3) secondary antioxidants from the group of ammonium salts, glycerol esters and anion-active substances, (4) light stabilizers from the group of benzophenones, benzotriazoles and sterically hindered amine light stabilizer, (5) flame-protection agents and synergistic substances from the group of halogenated organic molecules and metal hydrates, (6) plasticizers from the group of phthalates, (7) process auxiliaries from glycerol and/or the group of alcohol esters, wax amides, fatty acids, metal stearates, natural waxes and polyethylene and polypropylene waxes and (8) additives from the group of antimicrobial agents, propellants, organic peroxides, fillers and stabilizers.

15. Polyolefin film according to claim 14 wherein the anti-blocking agent comprises a member of the group consisting of micronized silica gel, precipitated silica and diatomaceous earth.

16. Polyolefin film according to claim 14 wherein the antiblocking agent is micronized silica gel having a specific pore volume of 0.4 ml/g to 1.8 ml/g.

17. Polyolefin film according to claim 14 wherein the organic component is slip agent which comprises one or more unsaturated fatty acid amides.

18. Polyolefin film according to claim 14 wherein the average particle size of the integrated additive composition relative to the median value of the volume distribution is 2 to 15 microns and the upper limit of the particle size, as defined as the particle size at which 90% of the volume of the particles are smaller than the given value, is 2.5 times the average value of the particle size.

* * * * *

UNITED STATES PATENT AND TRADEMARK OFFICE
CERTIFICATE OF CORRECTION

PATENT NO.    : 6,294,505 B1
DATED         : September 25, 2001
INVENTOR(S)   : Lüers et al.

It is certified that error appears in the above-identified patent and that said Letters Patent is hereby corrected as shown below:

Column 8,
Lines 59, 62 and 65, "claim 6" should be -- claim 7 --.

Column 9,
Lines 1 and 4, "claim 6" should be -- claim 7 --.

Signed and Sealed this

Fourteenth Day of May, 2002

Attest:

JAMES E. ROGAN
Attesting Officer   Director of the United States Patent and Trademark Office